United States Patent Office 3,647,911
Patented Mar. 7, 1972

3,647,911
DEHYDROGENATION OF SATURATED HYDROCARBONS
Kenneth D. Vesely, Arlington Heights, and Harold D. Gass, Jr., Cicero, Ill., assignors to Universal Oil Products Company, Des Plaines, Ill.
No Drawing. Filed June 17, 1969, Ser. No. 834,165
Int. Cl. B01j 11/74; C07c 5/18
U.S. Cl. 260—683.3    8 Claims

ABSTRACT OF THE DISCLOSURE

Saturated hydrocarbons are dehydrogenated in contact with a catalyst comprising arsenic in from about a 0.15 to about a 0.45 atomic ratio with platinum, and from about 0.01 to about 1.5 wt. percent lithium composited with alumina. Improved activity and selectivity results from the method of reducing and sulfiding the catalyst prior to use.

BACKGROUND OF THE INVENTION

The catalytic dehydrogenation of saturated hydrocarbons to produce more useful and valuable unsaturated hydrocarbons has been widely practiced. The various olefinic products are in demand in the petroleum, petrochemical, heavy chemical, pharmaceutical and plastics industries to produce many useful products. Thus, propane is converted to propylene which is utilized in the manufacture of isopropyl alcohol, propylene dimer, cumene, polypropylene, isoprene and the like. Butane is converted to butene-1 and butene-2 which are extensively used in the manufacture of polymer and alkylate gasolines, while isobutane is converted to isobutylene which finds use in the production of isooctane, butyl rubber, etc. n-Dodecenes, produced by the dehydrogenation of dodecane, are a useful intermediate in the manufacture of biodegradable alkyl benzene sulfonate detergent.

While dehydrogenation can be accomplished thermally without the aid of a catalyst, the relatively high temperatures required are conducive to cracking and other undesirable side reactions leading to poor product distribution and excessive carbon formation. There are numerous catalysts available for promoting the relatively low temperature conversion of paraffins to olefins. Such catalysts generally comprise one or more metals of Groups VI and VIII of the Periodic Table or a suitable compound thereof. These catalysts are employed per se, usually in a powdered or small particulate form, or disposed on a carrier material, usually a refractory inorganic oxide. Thus, suitable catalyst usually comprise chromium, tungsten, molybdenum, iron, cobalt, nickel, platinum, palladium, iridium, ruthenium, rhodium, osmium, etc., generally composited with alumina, silica, zirconia, thoria, boria, etc.

Dehydrogenation is generally effected at conditions which include a temperature of from about 750° F. to about 1300° F., a pressure of from about atmospheric to about 100 pounds per square inch gauge, and a liquid hourly space velocity (LHSV) of from about 1.0 to about 35 or more. The dehydrogenation is usually effected in the presence of hydrogen in an amount to result in a hydrogen/hydrocarbon mol ratio of from about 1 to about 10.

A particularly suitable dehydrogenation catalyst which functions at close to equilibrium reaction conditions with a minimum of cracking or other undesirable side reactions is described in U.S. Pat. No. 3,291,755 issued to V. Haensel et al. Briefly, the catalyst comprises a refractory metal oxide, particularly alumina, containing from about 0.01 to about 1.5 wt. percent lithium and from about .05 to about 5 wt. percent of a Group VIII metal, especially platinum, composited therewith. Arsenic is included in the catalyst in an atomic ratio of from about 0.15 to about 0.45 with the Group VIII metal to effectively inhibit the cracking and isomerization tendencies of the other catalytic components. Antimony and bismuth perform a similar function although aresenic is preferred.

It is an object of this invention to present an improved dehydrogenation process and an improved catalyst with respect thereto.

SUMMARY OF THE INVENTION

In one of its broad aspects, this invention embodies a process for dehydrogenating a saturated hydrocarbon which comprises treating said hydrocarbon in contact with a catalytic composite at dehydrogenation conditions including a temperature of from about 750° to about 1300° F., said catalytic composite comprising a metallic component selected from the group consisting of arsenic, antimony and bismuth in from about a 0.15 to about a 0.45 atomic ratio with a Group VIII metallic component, and from about 0.01 to about 1.5 wt. percent lithium composited with alumina, said catalytic composite having been oxidized at a temperature in excess of about 400° F., reduced in a substantially dry hydrogen atmosphere at a temperature in excess of about 850° F., and sulfided in contact with hydrogen sulfide at a temperature of less than about 200° F.

Other objects and embodiments of this invention will become apparent in the following detailed specification.

While the dehydrogenation process herein contemplated is especially advantageous with respect to the dehydrogenation of lower molecular weight staturated hydrocarbons, e.g., those containing from about 3 to about 5 carbon atoms per molecule such as propane, butane, isobutane, pentane, etc., suitable charge stocks also include higher molecular weight saturated hydrocarbons containing up to about 18 carbon atoms per molecule, e.g., decane, undecane, dodecane, tetradecane, and the like.

Dehydrogenation reaction conditions employed herein are as previously described. Although suitable results are obtained at a temperature of from about 750° to about 1300° F., an intermediate temperature of from about 975° to about 1150° F. is preferable. Reaction conditions further include a pressure of from about 0 to about 100 p.s.i.g., preferably from about 10 to about 40 p.s.i.g., suitably maintained by hydrogen, including recycle hydrogen, charged in admixture with the saturated hydrocarbon in from about a 1:1 to about a 10:1 mol ratio. The hydrocarbon feed stock may be charged in contact with the catalyst at a liquid hourly space velocity of from about 1.0 to about 10, i.e., from about 1 to about 10 volumes of charge per volume of catalyst per hour.

The dehydrogenation catalyst comprises a metallic component selected from the group consisting of arsenic, antimony and bismuth in from about a 0.15 to about a 0.45 atomic ratio with a noble metal of Group VIII. It is understood that regardless of the precise form in which the various metallic components exist, the concentrations are calculated as the elemental metal. Of the arsenic, antimony and bismuth group, arsenic is preferred, particularly in combination with platinum of the Group VIII noble metals. The noble metals of Group VIII which may be used further include palladium, iridium, ruthenium, rhodium and osmium. In any event, the Group VIII metal will comprise from about 0.05 to about 5 wt. percent of the final catalytic composite. The catalyst also comprises from about 0.01 to about 1.5 wt. percent lithium composited with a non-acidic, and especially halogen-free, refractory inorganic oxide carrier material. A substantially halogen-free alumina is a particularly preferred carrier material.

The described catalytic composite may be prepared by any conventional or otherwise convenient method. In general, the alumina carrier material is prepared and formed into a desired size and shape. The other catalyst components, e.g., platinum, lithium and arsenic, may be impregnated thereon in any desired sequence with or without intermediate drying and/or calcining. Preferably, the Group VIII noble metal component is impregnated on the alumina carrier material from an aqueous solution, e.g., an aqueous chloroplatinic acid solution. The lithium component is thereafter impregnated on the carrier material from an aqueous solution of a suitable compound thereof, such as lithium nitrate, followed by impregnation of the arsenic, bismuth and/or antimony component, for example, from an aqueous arsenic acid impregnating solution. In the preferred manner, the sequential impregnation is effected with intermediate drying and calcination. Thus, the impregnated carrier material is dried subsequent to each impregnation and calcined or oxidized in air at a temperature in excess of about 400° F., preferably at a temperature of from about 400° to about 600° F., for a period of at least about 1 hour. The temperature is then increased to a level of from about 700° to about 1000° F. and the composite further calcined for about 1 hour or more. As an aid in reducing the chloride content of the catalyst to an acceptable level, the calcination may be effected in the presence of steam, for example, air comprising up to about 25% steam.

The dehydrogenation process of this invention derives improvement from a particular method of prereducing and sulfiding the oxidized catalyst composite. Thus, the oxidized catalyst is pre-reduced in a substantially dry hydrogen atmosphere at a temperature in excess of about 850° F. The oxidized catalyst may be disposed on a moving belt and passed in contact with a dry hydrogen stream, or the catalyst may be treated in contact with hydrogen in a moving or fixed-bed type of operation. Preferably, the catalyst is treated disposed as a fixed bed in a suitable reactor. A hydrogen-rich gas stream, preferably with a hydrogen concentration in excess of about 95.0 mol percent, is continuously circulated through the catalyst bed at a pressure ranging from about atmospheric to about 100 p.s.i.g. The hydrogen is suitably circulated in contact with the catalyst at a temperature of from about 850° to about 1050° F. for a period of about 1 hour, the temperature being thereafter reduced to from about 50° to about 200° F. and the circulation of hydrogen stopped.

It is advisable, in the interest of safety, to purge the residual hydrogen from the system with an inert gas such as nitrogen, the nitrogen purge being continued until the effluent gas stream contains less than about 2 mol percent hydrogen. In accordance with this invention, the reduced catalyst composite is sulfided in contact with hydrogen sulfide at a temperature of less than about 200° F. While the sulfiding may be effected in the fixed-bed system, it is preferred to transfer the reduced catalyst composite to a nitrogen-purged conical blender for sulfiding. In any case, the reduced catalyst composite is treated in contact with hydrogen sulfide for a time sufficient to adsorb from about 0.05 to about 1.5 w. percent sulfur thereon. Suitably, the reduced catalyst composite is treated in contact with the hydrogen sulfide at a temperature of from about 50° to about 200° F. for a period of about 1 hour.

The following example is presented in illustration of the process of this invention and is not intended as an undue limitation on the generally broad scope of the invention as set out in the appended claims.

Example I

A hydrocarbon feed stock consisting of $C_{11}$–$C_{14}$ n-paraffins was dehydrogenated in contact with a catalyst composite comprising platinum, lithium and arsenic composited with alumina. The catalyst composite was prepared by separately impregnating the individual components on the alumina with intermediate calcination. Thus, $\frac{1}{16}''$ alumina spheres were immersed in an aqueous chloroplatinic acid impregnating solution in a steam jacketed rotary evaporator. The evaporator was rotated at ambient temperature for about 30 minutes and the impregnating solution was thereafter evaporated to dryness by the application of steam to the evaporator. Sufficient chloroplatinic acid was employed to yield 0.75 wt. percent platinum on the finished catalyst. The impregnated spheres were then calcined in a stream of air for 2 hours at 600° F., then at 1000° F. for four hours, and then at 1000° F. for 5 hours in air containing 20% steam.

The platinum containing spheres were thereafter impregnated with an aqueous lithium nitrate solution of a concentration to yield a finished catalyst containing 0.5 wt. percent lithium. Impregnation was as described with respect to the platinum component. The platinum-lithium containing spheres were calcined for 1 hour at 600° F. in a flow of air comprising about 10% steam, and then at 950° F. for 2 hours in a flow of air comprising 20% steam.

Thereafter, the platinum-lithium containing spheres were impregnated with an aqueous arsenic acid solution in the described manner, the pH of the solution being adjusted to 8.8–9.0 with ammonium hydroxide. Sufficient arsenic acid was used to provide an arsenic/platinum atom ratio of about 1.3 on the finished catalyst. The spheres were then after calcined for 1 hour at 600° F. in a stream of air comprising 10% steam, and 2 hours at 950° F. in a stream of air comprising 20% steam.

One portion of the catalyst thus prepared was subsequently employed as catalyst A as hereinafter related. The remaining portion of the catalyst was reduced and sulfided in accordance with this invention. The last mentioned catalyst is hereinafter referred to as catalyst B.

The portion of the catalyst to be reduced and sulfided was placed in a fixed bed of a vertical reactor and treated in contact with a flow of dry air at 1050° F. for 3 hours. The reactor was then purged with nitrogen and the temperature reduced to 1025° F. The catalyst was thereafter treated in contact with hydrogen continuously circulated at a gaseous hourly space velocity (GHSV) of about 500. The pressure was maintained at 25 p.s.i.g. After 1 hour, the temperature was lowered to 250° F. in the circulating hydrogen flow. The system was then purged with nitrogen and the temperature reduced to 100° F. The reduced catalyst was loaded in a conical blender and mixed in contact with hydrogen sulfide for about 1 hour whereby 0.1 wt. percent sulfur was deposited on the catalyst.

The described catalysts, A and B, were utilized to effect dehydrogenation of the aforementioned hydrocarbon feed stock at substantially the same reaction conditions. Thus, the catalyst was in each case disposed in a fixed bed of a vertical tubular reactor and the hydrocarbon feed stock processed down flow in contact with the catalyst at a liquid hourly space velocity (LHSV) of about 32 together with hydrogen to effect an 8:1 hydrogen/hydrocarbon mol ratio. The reactor pressure was maintained at about 30 p.s.i.g. and the initial temperature of 860° F. was adjusted upwardly periodically. The effluent stream was analyzed to determine n-olefin content and the degree of isomerization. The results with respect to the use of catalyst A and catalyst B are tabulated below.

| On stream, hours | 0–20 | 20–52 | 52–188 | 188–248 |
|---|---|---|---|---|
| Temperature, ° F | 860 | 869 | 878 | 887 |
| Product: | | | | |
| Percent n-olefins: | | | | |
| Catalyst A | 7.9 | 8.6 | 9.2 | 9.7 |
| Catalyst B | 9.2 | 9.4 | 9.8 | 10.2 |
| Percent non-normal: | | | | |
| Catalyst A | 0.6 | 0.5 | 0.6 | 0.6 |
| Catalyst B | 1.9 | 0.7 | 0.4 | 0.4 |

A comparison of the results achieved with catalyst A and the reduced and sulfided catalyst B shows a clear superiority for the reduced and sulfided catalyst not only in activity but, after 152 hours on stream, in selectivity. The reduced and sulfided catalyst continued to exhibit excellent stability over a period of 26 days on stream, and at the end of this time was maintaining over 9% conversion at a temperature of only 891° F.

We claim as our invention:

1. A process for dehydrogenating a saturated hydrocarbon which comprises treating said hydrocarbon in contact with a catalytic composite at dehydrogenation conditions including a temperature of from about 750° to about 1300° F., said catalytic composite comprising a metallic component selected from the group consisting of arsenic, antimony and bismuth in from about a 0.15 to about a 0.45 atomic ratio with a Group VIII metallic component, and from about 0.01 to about 1.5 wt. percent lithium composited with alumina, said catalytic composite having been oxidized at a temperature in excess of about 400° F., reduced in a substantially dry hydrogen atmosphere at a temperature in excess of about 850° F., and thereafter sulfided in contact with hydrogen sulfide at a temperature of less than about 200° F. for a time sufficient to adsorb from about 0.05 to about 1.5 wt. percent sulfur thereon, prior to treating said hydrocarbon in contact therewith.

2. The process of claim 1 further characterized in that said dehydrogenation conditions include a temperature of from about 975° to about 1150° F.

3. The process of claim 1 further characterized in that said Group VIII metal is platinum.

4. The process of claim 1 further characterized in that said catalytic composite comprises from about 0.05 to about 5.0 wt. percent platinum.

5. The process of claim 1 further characterized in that said catalytic composite comprises arsenic in from about a 0.15 to about a 0.45 atomic ratio with platinum.

6. The process of claim 1 further characterized in that said catalytic composite is reduced at a temperature of from about 850° to about 1050° F.

7. The process of claim 1 further characterized in that said catalytic composite is sulfided in contact with hydrogen sulfide at a temperature of from about 50° to about 200° F.

8. A catalytic composite comprising arsenic in from about a 0.15 to about a 0.45 atomic ratio with platinum, and from about 0.01 to about 1.5 wt. percent lithium composited with alumina, said catalytic composite having been oxidized at a temperature in excess of about 850° F., reduced in a substantially dry hydrogen atmosphere at a temperature of from about 850° to about 1050° F., and sulfided in contact with hydrogen sulfide at a temperature of from about 50° to about 200° F. for a time sufficient to adsorb from about 0.05 to about 1.5 wt. percent sulfur thereon.

References Cited
UNITED STATES PATENTS

| | | | |
|---|---|---|---|
| 3,067,130 | 12/1962 | Baldwin et al. | 208—140 |
| 3,291,855 | 12/1966 | Haensel | 260—683.3 |
| 3,293,319 | 12/1966 | Haensel et al. | 260—683.3 |
| 3,360,586 | 12/1967 | Bloch et al. | 260—683.3 |
| 3,439,061 | 4/1969 | Henderson et al. | 260—683.3 |

DELBERT E. GANTZ, Primary Examiner

G. E. SCHMITKONS, Assistant Examiner

U.S. Cl. X.R.
252—439, 464, 466